US009853996B2

(12) United States Patent
Eliyahu et al.

(10) Patent No.: US 9,853,996 B2
(45) Date of Patent: Dec. 26, 2017

(54) SYSTEM AND METHOD FOR IDENTIFYING AND PREVENTING MALICIOUS API ATTACKS

(71) Applicant: SECFUL, INC., Wilmington, DE (US)

(72) Inventors: Roey Eliyahu, Yavne (IL); Omer Sadika, Yad Binyamin (IL)

(73) Assignee: SECFUL, INC., Wilmington, DE (US)

(*) Notice: Subject to any disclaimer, the term of this patent is extended or adjusted under 35 U.S.C. 154(b) by 0 days.

(21) Appl. No.: 15/098,263

(22) Filed: Apr. 13, 2016

(65) Prior Publication Data

US 2016/0308900 A1 Oct. 20, 2016

Related U.S. Application Data

(60) Provisional application No. 62/146,470, filed on Apr. 13, 2015.

(51) Int. Cl.
*H04L 29/06* (2006.01)
*H04L 29/08* (2006.01)
*G06F 21/55* (2013.01)

(52) U.S. Cl.
CPC ........ *H04L 63/1441* (2013.01); *G06F 21/552* (2013.01); *H04L 63/1416* (2013.01); *H04L 63/1425* (2013.01); *H04L 67/36* (2013.01); *H04L 67/42* (2013.01)

(58) Field of Classification Search
USPC .......................................................... 726/23
See application file for complete search history.

(56) References Cited

U.S. PATENT DOCUMENTS

| 9,171,146 | B2 * | 10/2015 | Vipat | G06F 21/44 |
| 2007/0083933 | A1 | 4/2007 | Venkatapathy et al. | |
| 2008/0016339 | A1 * | 1/2008 | Shukla | G06F 21/53 713/164 |
| 2013/0097706 | A1 * | 4/2013 | Titonis | G06F 21/56 726/24 |
| 2013/0246944 | A1 * | 9/2013 | Pandiyan | G06F 9/54 715/760 |

(Continued)

FOREIGN PATENT DOCUMENTS

WO WO 2014/122662 8/2014

*Primary Examiner* — William Goodchild
(74) *Attorney, Agent, or Firm* — Pearl Cohen Zedek Latzer Baratz LLP

(57) ABSTRACT

A system and method for identifying and preventing malicious application programming interface attacks is configured to, during a learning stage: monitor all requests sent to and from the server API; identify one or more first characteristic data points of each request and response sent during the learning stage; and determine, based at least in part on the identified one or more first characteristic data points, one or more characteristic data models, wherein a characteristic data model represents at least one of an expected input to the API and an expected output of the API; and during a protection stage: monitor all requests sent to and from the server API; identify one or more second characteristic data points of each request and response sent during the protection stage; and one of validate and invalidate the identified one or more second characteristic data points against the one or more characteristic data models.

20 Claims, 10 Drawing Sheets

(56) References Cited

U.S. PATENT DOCUMENTS

| | | | | |
|---|---|---|---|---|
| 2015/0350234 A1* | 12/2015 | Reno | ................... | H04L 63/1433 |
| | | | | 726/25 |
| 2016/0011732 A1* | 1/2016 | Yang | ....................... | G06F 21/50 |
| | | | | 715/763 |
| 2016/0099966 A1* | 4/2016 | Yang | ....................... | G06F 21/50 |
| | | | | 726/23 |

\* cited by examiner

SYSTEM AND METHOD FOR IDENTIFYING AND PREVENTING MALICIOUS API ATTACKS

CROSS-REFERENCE TO RELATED APPLICATIONS

This patent application claims the benefit of from U.S. Provisional Patent Application No. 62/146,470, filed on Apr. 13, 2015, entitled "End to End Application Specific Certification Security (EACS)," which is hereby incorporated by reference in its entirety.

FIELD OF THE INVENTION

The present invention is in the field of cyber-security. In particular, the present invention is directed to systems and methods for identifying and preventing malicious application programming interface (API) attacks.

BACKGROUND OF THE INVENTION

Typically, an application programming interface (API) is understood as a particular set of rules and specifications that a software program can follow in order to access and make use of the services and resources provided by another particular software program that implements that API. The API serves as an interface between different software programs and facilitates their interaction, similar to the way that the user interface facilitates interaction between humans and computers. APIs are often used in a client-server architecture, to enable direct interfacing between a client device (or "client") and a server device (or "server"), e.g., over a network such as the Internet. In such architecture, API calls are typically sent back and forth between a client and a server in the form of requests (from the client device) and responses (from the server devices).

As a matter of course, different companies, which provide various different services, functionalities, and/or information, design and deploy their own unique APIs having their own unique data structures, etc. Furthermore, there are many different types of API architectures (e.g., RESTful, SOAP, XML-RPC, etc.), which may be implemented in a variety of different situations, such as Public APIs (available to developers), Private APIs (unavailable to developers), Internal APIs, third party APIs, and may relate to any number of specific applications such as, for example, mobile applications, web application, internet-of-things (IOT) applications and technologies, etc. APIs may also be configured for a variety of common data protocols (e.g., (JSON, XML, YAML, etc.), over a variety of communication protocols (Ethernet, IP, TCP, UDP, HTTP, HTTPS, HTTP/2, WebSocket, etc.). With so many variables, each unique API will have its own unique vulnerabilities to attack by hackers, etc.

Most APIs are vulnerable to advanced persistent threat (APT) attacks, zero day attacks, and other similar attacks which look to exploit the vulnerabilities of a company's API. Moreover, developers put limited attention to security, and continued development of an API requires careful review of implemented legacy security systems and either updates for security assurance or using the developer's own code for security assurance and validity. The current state of the art creates opportunities for exploiting vulnerabilities and enhances security challenges.

Generally, when an attacker wants to attack an API and details regarding that API are not publically available, there are a number of steps/processes often taken to learn about the API: (1) Reconnaissance—"sniffing" or otherwise listening to the traffic back and forth between the client and the server in order to document the structure, communication protocols, etc., of the API and reverse-engineering the information to get a complete picture of the API; (2) Generate illegal requests—once all the API details are known, the attacker can begin sending illegal requests directly to the backend of the server (rather than following the set API protocols, which typically only allow forward-facing communication, e.g., via a mobile application). These calls can include malicious code which can change parameters, add invalid inputs, etc., and may eventually expose a vulnerability of the API; and (3) Attack—upon find a vulnerability, implementing an attack on the server via the API.

Presently available cyber-security systems do not resolve these fundamental flaws, as they account only for "known attacks", e.g., attacks that have identifiable signatures that can be monitored for and blocked, for example monitoring calls for a specific term, etc. However, unknown vulnerabilities, which are specific to each API, cannot be accounted for using these methods. Instead, a customized solution that is tailored to each unique API is required.

SUMMARY OF THE INVENTION

An embodiment of the invention includes a method for identifying and preventing malicious application programming interface (API) attacks in a client-server architecture. In some embodiments, the method may be performed on a computer having a processor, a memory, and one or more code sets stored in the memory and executed by the processor. The method may include, during a learning stage: monitoring all requests sent to a server API, and all responses sent from the server API; identifying one or more first characteristic data points of each request and response sent during the learning stage; and determining, based at least in part on the identified one or more first characteristic data points, one or more characteristic data models, wherein a characteristic data model represents at least one of an expected input to the API and an expected output of the API; and, during a protection stage, monitoring all requests sent to the server API, and all responses sent from the server API, identifying one or more second characteristic data points of each request and response sent during the protection stage, and one of validating and invalidating, by the processor, the identified one or more second characteristic data points against the one or more characteristic data models.

In some embodiments, the method may further include passing to the server requests having no invalidated one or more second characteristic data points; and passing from the server responses having no invalidated one or more second characteristic data points. In some embodiments, the method may further include blocking to the server requests having invalidated one or more second characteristic data points; and blocking from the server responses having invalidated one or more second characteristic data points.

In some embodiments, the method may further include generating an alert for each request having invalidated one or more second characteristic data points; and generating and alert for each response having invalidated one or more second characteristic data points. In some embodiments, the method may further include generating an alert timeline, wherein the alert timeline represents a selection of one or more aggregations of alerts, the alerts in each of the one or more aggregations having a predefined similarity, the one or more aggregations being organized in a predefined order; and displaying the alert timeline on a visual display.

In some embodiments, the method may further include generating one or more attacker profiles based at least in part on the validating step; determining one or more suspicion scores for each attacker profile; and identifying one or more suspicious profiles based at least in part on respective suspicion scores, wherein all future requests and responses related to an identified suspicious profile are flagged with an alert irrespective of validity. In some embodiments, the method may further include updating the one or more characteristic data models based at least in part on the identified one or more second characteristic data points of each request and response sent during the protection stage. In some embodiments, the server API is one of a RESTful API, a SOAP API, an XML-RPC API, and a WSDL API. In some embodiments, the method may further include generating documentation comprising information reflecting a complete structure of the server API.

In accordance with further embodiments of the invention, a system may be provided which may implement the methods described herein according to embodiments of the invention.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
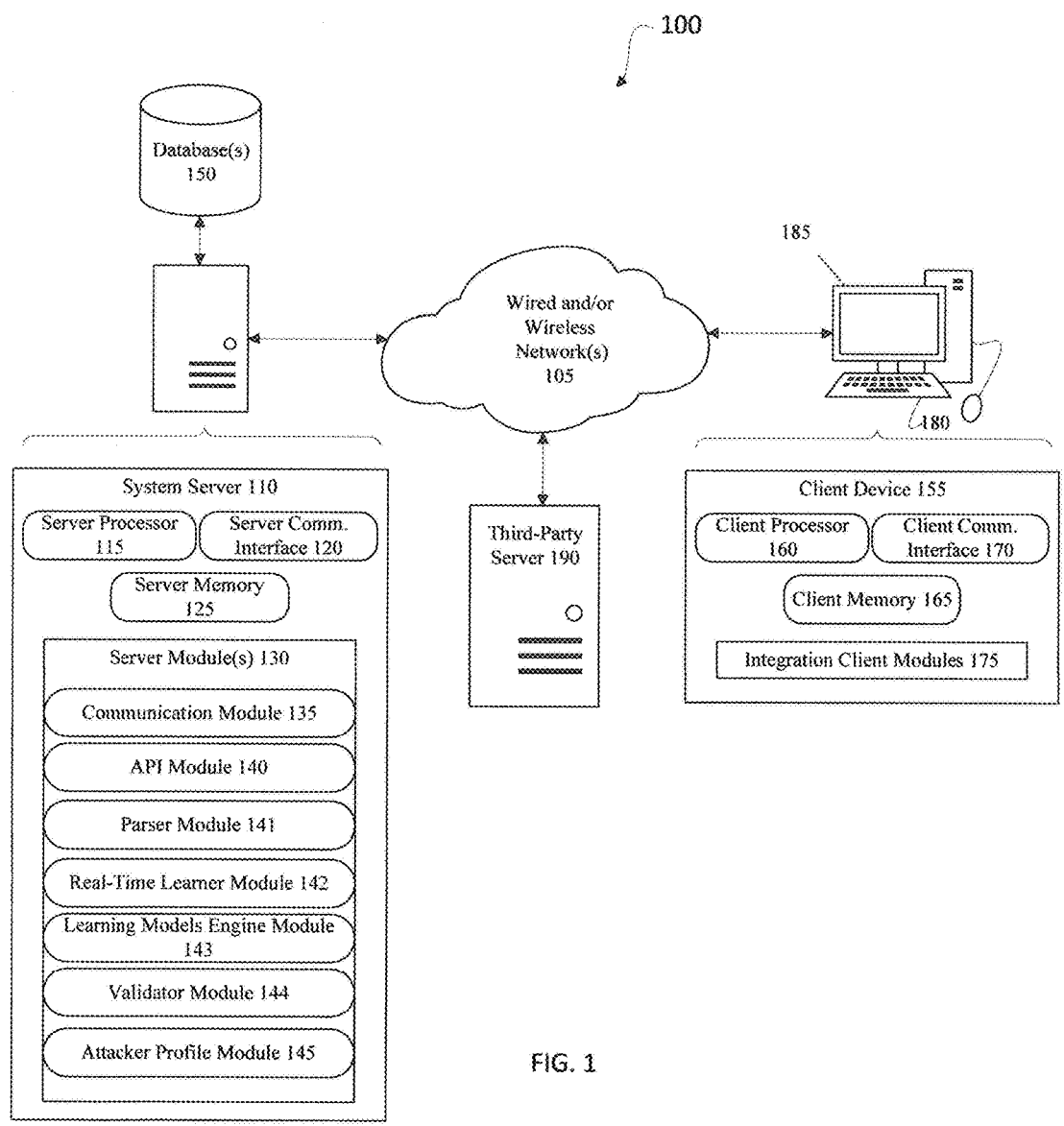
FIG. 1 is a high level diagram illustrating an example configuration of a system for identifying and preventing malicious API attacks according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Some embodiments of the invention offer end to end optimizing security for APIs, i.e., from development to production and communication. Some embodiments of the invention are based on protecting applications through building a standard de facto API Secured Development Process (SDP) that inspects all communications (e.g., requests/responses) to and from the server from all client devices, via an API, and utilizes machine learning algorithms to generate approval models (application customized) of all client-server communication including fields, structures, flow, etc. Some embodiments of the invention offer Application Template Specific Analysis, which, in some embodiments, may lead to alerts and/or blocking of requests/responses which may contain unauthorized variations of template generated in each application.

FIG. 1 shows a high level diagram illustrating an example configuration of a system 100 for identifying and preventing malicious API attacks, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is, therefore, intended to represent various forms of digital computers, such as laptops, desktops, workstations, personal digital assistants, servers, blade servers, mainframes, and other appropriate computers and/ or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to API security, and other functions of embodiments of the invention as will be described in greater detail below. Server processor 115 may be one or a number of processors, a central processing unit (CPU), a graphics processing unit (GPU), a multi-processor core, or any other type of processor, depending on the particular implementation. System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by for example executing code or software, and may be or may execute the functionality of the modules as described herein.

As shown in FIG. 1, the exemplary software modules may include a communication module 135, an API module 140, a parser module 141, a real-time learner module 142, a learning models engine module 143, a validator module 144, and an attacker profile module 145. Communication module 135 may be executed by server processor 115 to facilitate communication between system server 110 and the various software and hardware components of system 100, such as, for example, server database 150 and/or client device 155 as described herein. API module 140, as described in detail herein, may be executed by server processor 115 to implement the various functions of the API. Of course, in some embodiments, the API may reside on and/or be implemented by a remote or otherwise separate server entirely.

Parser module 141 may be executed by server processor 115 to parse large amounts and/or strings of data from API calls (e.g., requests from a client device and/or responses from a server device) into manageable data elements. Real-time learner module 142 may be executed by server processor 115 to identify characteristic data points or features within the data of individual requests/responses, as described herein. Learning models engine module 143 may be executed by server processor 115 to determine (and update) characteristic data models, as described herein. Validator module 144 may be executed by server processor 115 to validate/invalidate API requests/responses, as described herein. And attacker profiling module 145 may be executed by server processor 115 to identify suspicious/ malicious profiles attempting to communicate with the API, as described herein.

It should be noted that, in accordance with various embodiments of the invention, server modules 130 may be executed entirely on system server 110 as a stand-alone software package, partly on system server 110 and partly on client device 155, entirely on client device 155, partly on system server 110 and partly on third-party server 190, or entirely on third-party server 190.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database (s) 150, for example, directly or remotely via network 105. Database 150 may include any of the memory configurations as described above, and may be in direct or indirect communication with system server 110. In some embodiments, database 150 stores the results/outputs of various modules, as described herein, and can represent a plurality of separate databases and/or partitions in a single database.

As described herein, among the computing devices on or connected to the network 105 may be one or more client devices 155. Client device 155 may be any standard computing device. As understood herein, in accordance with one or more embodiments, a computing device may be a stationary computing device, such as a desktop computer, kiosk and/or other machine, each of which generally has one or more processors, such as client processor 160, configured to execute code to implement a variety of functions, a computer-readable memory, such as client memory 165, a client communication interface 170, for connecting to the network 105, one or more client modules, such as integration client module 175, one or more input devices, such as input devices 180, and one or more output devices, such as output devices 185. Typical input devices, such as, for example, input devices 185, may include a keyboard, pointing device (e.g., mouse or digitized stylus), a web-camera, and/or a touch-sensitive display, etc. Typical output devices, such as, for example output device 185 may include one or more of a monitor, display, speaker, printer, etc.

In some embodiments, integration client module 175 may be executed by client processor 160 to provide the various functionalities of client device 155. In particular, in some embodiments, integration client module 175 may provide a client-side interface with which a user of client device 155 can interact, to, among other things, send requests to the API and receive results, etc.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, client device 155 may be a "dummy" terminal, by which processing and computing may be performed on system server 110, and information may then be provided to client device 155 via server communication interface 120 for display and/or basic data manipulation. In some embodiments, modules depicted as existing on and/or executing on one device may additionally or alternatively exist on and/or execute on another device. For example, in some embodiments, API module 140, which is depicted in FIG. 1 as existing and executing on system server 110, may additionally or alternatively exist and/or execute on third-party server 190. In some embodiments, third-party server 190 may provide the same or similar structure and functionality as system server 110, but may be owned, possessed, and/or operated by a third-party.

Figure 2:
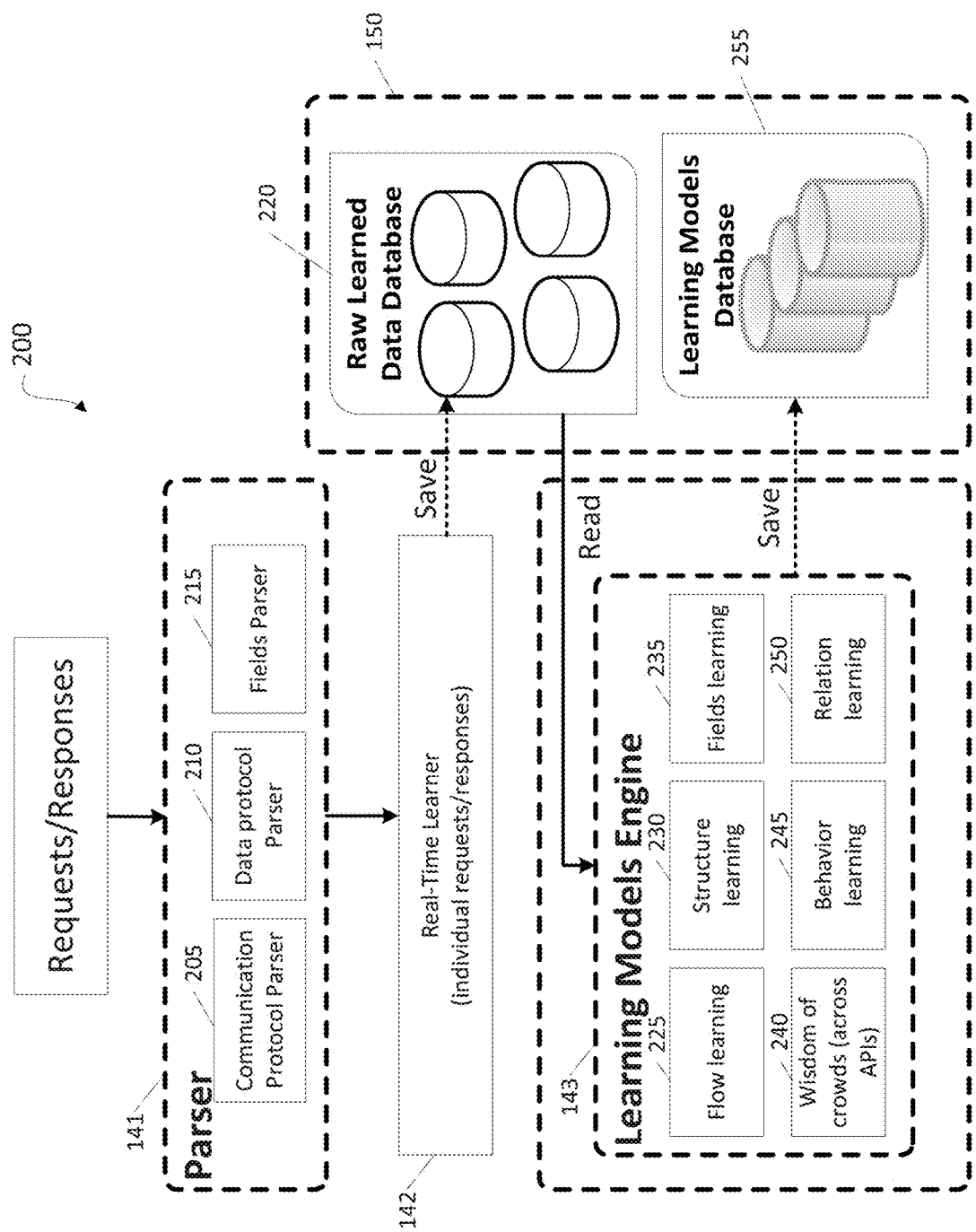
FIG. 2 is a block diagram illustrating a data flow between key components of a first part of the system for identifying and preventing malicious API attacks according to at least one embodiment of the invention.

FIG. 2 is a block diagram illustrating a data flow 200 between key components of a first part of the system for identifying and preventing malicious API attacks, according to at least one embodiment of the invention. In particular, FIG. 2 illustrates a data flow between parser module 141, real-time learner 142, learning models engine module 143, and database 150 of FIG. 1 during a learning stage, according to some embodiments of the invention. Some embodiments of system 100 (FIG. 1) are configured to receive all API calls (requests from clients and responses from the server), e.g., by diverting the calls through the system or otherwise providing a copy of each API call to the system. Depending on the API architecture (e.g., RESTful, SOAP, XML-RPC, WSDL, etc.), the type of data protocol (e.g., JSON, XML, YAML, etc.), the type of communication protocol (e.g., Ethernet, IP, TCP, UDP, HTTP, HTTPS, HTTP/2, WebSocket, etc.), the type of application (mobile application, web application, internet of things (IOT) application, etc.), the network architecture (e.g., Public API, Private API, Internal API, third-party API, etc., the data transmitted in an API call can take a variety of different forms, and can have a variety of different types of information.

For example, in RESTful API architecture, the API is typically structured using a plurality of Uniform Resource Locators (URLs) in which the objects are endpoints, including the URL parameters or "methods" allowed per end point, e.g., GET, PUT, POST, AND/OR DELETE. (In this configuration, GET is used to retrieve data, PUT is commonly used to update/replace an object, POST is used to create a new instance of an object, and DELETE is used to delete and object.)

Figure 6:
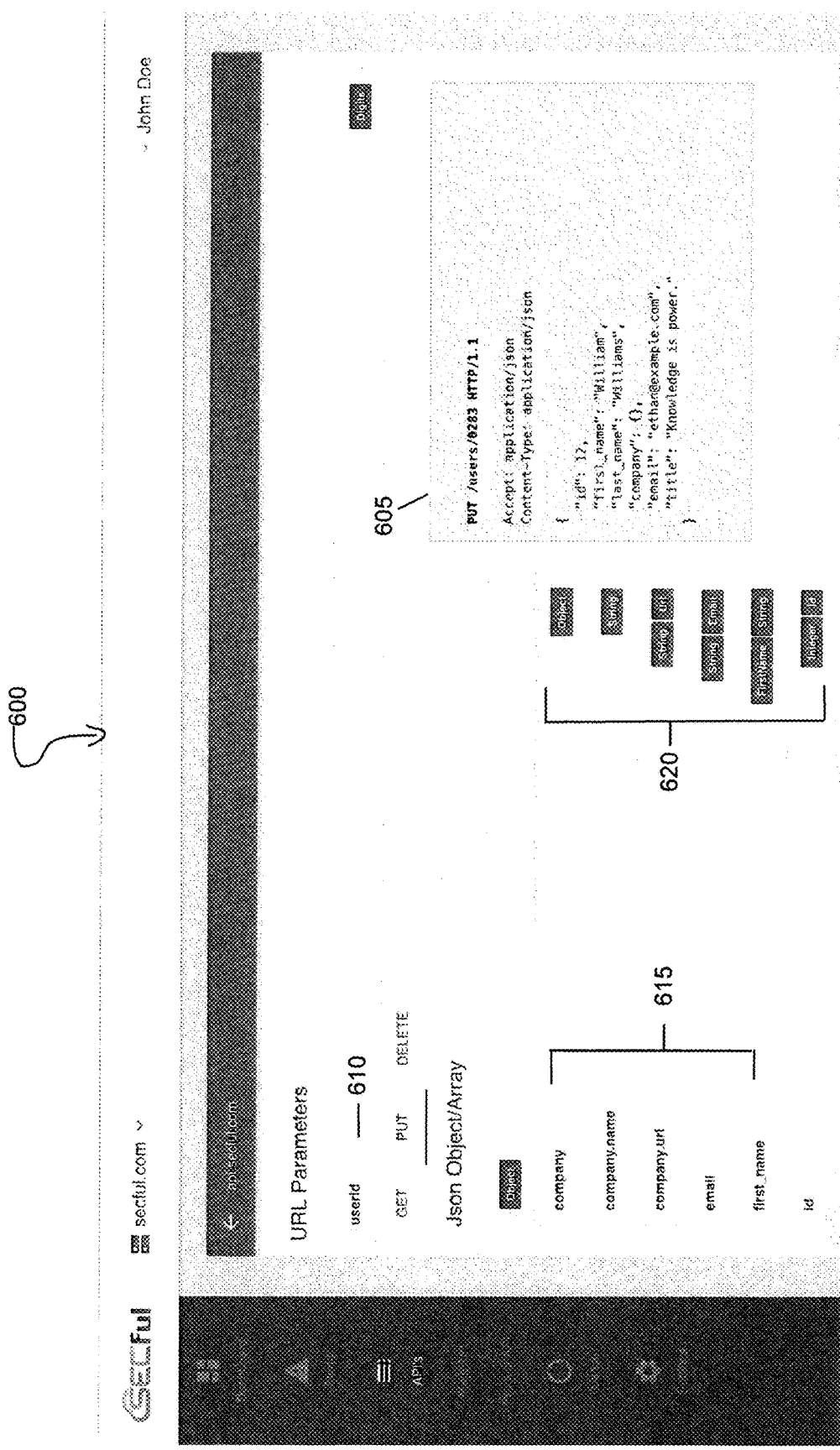
FIG. 6 is an example API endpoint configuration illustrated according to at least one embodiment of the invention.

Turning briefly to FIG. 6, an example API endpoint configuration 600 is illustrated according to at least one embodiment of the invention. API endpoint configuration 600 includes API call 605, URL parameters 610, and endpoints 615. As explained in further detail herein, FIG. 6 also shows the expected inputs (and/or outputs) 620 for each object (also referred to herein as characteristic data models) as determined according to some embodiments of the invention.

Figure 7:
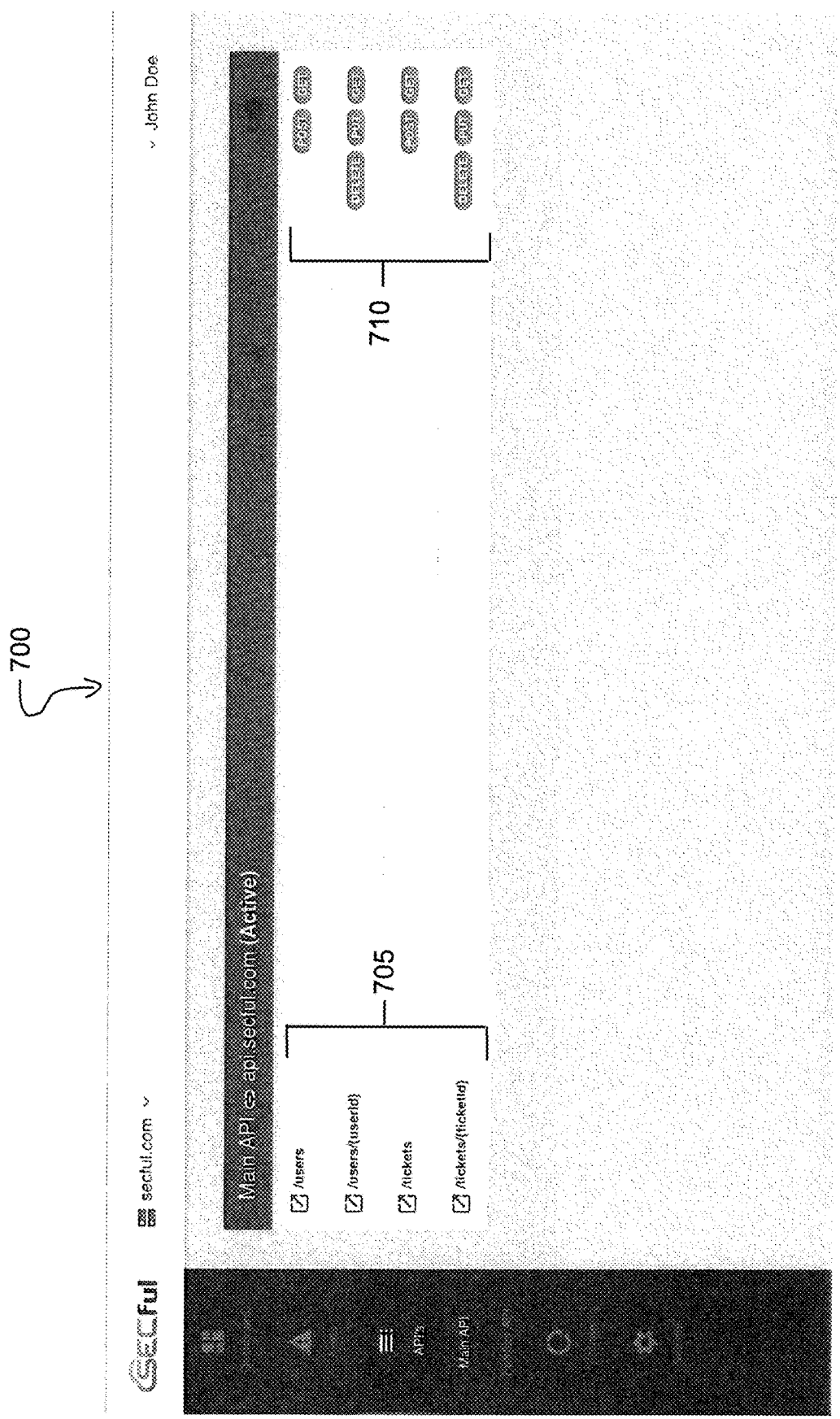
FIG. 7 is an example API overview configuration illustrated according to at least one embodiment of the invention.

Turning now briefly to FIG. 7, an example API overview configuration 700 is illustrated according to at least one embodiment of the invention. FIG. 7 shows an overview visual in which a plurality of API URL endpoints 705, each with their associated URL parameters 710, is displayed.

Turning back to FIG. 2, in some embodiments, system 100 may include parser module 141, which is configured to parse the data strings representing the requests/responses into consumable segments of information. For example, in some embodiments, parser module 141 may further include communication protocol parser 205, data protocol parser 210, and fields parser 215. Of course, additional/other parsers may also/alternatively be implemented depending on the particular API and data being communicated. In some embodiments, communication protocol parser 205, may parse or otherwise identify the particular communication protocol (e.g., Ethernet, IP, TCP, UDP, HTTP, HTTPS, HTTP/2, etc.), data protocol parser 210 may parse or otherwise identify the particular data protocol (e.g., JSON, XML, YAML, etc.), and fields parser 215 may parse or otherwise identify particular fields, attributes, property names, and/or values, etc.

System 100 may further include real-time learner module 142, which in some embodiments may be configured to receive data that has been parsed by parser module 141. Information can be passed from parser module 141 to real-time learner module 142 which is configured to analyze each individual request/response and learn or otherwise identify the composition of that request/response. In some embodiments, as each request/response is analyzed, real-time learner module 142 may be configured to save the raw learned data about each request or response, e.g., to a raw learned data database 220 of database 150. For example, call 605 (FIG. 6) contains a header "id", which returned "12". As such, in some embodiments the real-time learner module 142 may, for example, identify and record that for this call the response was a two-digit integer. This same data point may be parsed from tens of thousands of calls and then the results can be analyzed, e.g., by learning models engine module 143, along with many other relevant data points, in order to determine one or more characteristic data models (expected input/output) for a given request and/or response.

In some embodiments, system 100 may include learning models engine module 143, which may contain one or more sub-modules for implementing various types of learning functions and analyses, in order to determine one or more characteristic data models (e.g., expected input/output/structure, etc.) for a given request and/or response. For example, learning models engine module 143 may contain flow learning 225, structure learning 230, fields learning 235, wisdom of crowds 240, behavior learning 245, and/or relation learning 250.

In some embodiments, flow learning 225 may be configured to recognize the order and/or sequence in which data is expected to be provided to the API. For example, in a typical flow for a sign-up process of a social media API, the expected sequence may be, for example, as follows: 1. user's first name (e.g., between three and twenty characters, alphabetic characters only, with a capital first letter); 2. user's last name (e.g., between three and twenty characters, alphabetic characters only, with a capital first letter); 3. e-mail address (standard e-mail format, e.g., john.doe@domain.com); 4. password (e.g., alphanumeric string containing at least one uppercase letter, one lowercase letter, one number, and at least 8 characters, etc.); and 5. password repeated identically. In this exemplary embodiment, flow learning 225 can learn the expected sequence by seeing the same sequence/pattern repeated again and again, and determine a characteristic data model representing this flow to be used in evaluating future data.

In some embodiments, structure learning 230 may be configured to recognize various specific and/or unique data structures which are expected to be seen in given API call. For example, in embodiments where RESTful architecture communication is implemented, structure learning 230 may be configured to analyze and inspect Uniform Resource Identifier (URI) structure, MIME type covering all types, method (post, get, put, delete, etc.), resources (objects), a resource's representation, etc. In some embodiments, structure learning 230 may be further configured to analyze and inspect a RESTful API's modeling, such as WADL (Web Application Description Language), RAML (RESTful API Modeling Language), and RSDL (RESTful Service Description Language), etc.

In some embodiments, fields learning 235, may be configured to execute content related analysis of each field/attribute/property to identify specific data types, e.g., ID, email, phone number, name, credit card, address, website URL, file URL, media (e.g., pictures, sound, video, etc.), message content, message subject, username, password, etc.) and generic data types (text, integer, decimal, binary, enumeration types, html, css, code (JavaScript, php, asp, C, C++, python, ruby, java, etc.), files, date, time, date-time, location, SQL, byte, bit, boolean, Yes/No, currency, list, dictionary, objects, URL, URI, etc.), length, size, unique structure, encoding, encryption, order, etc.

In some embodiments, wisdom of crowds 240 may be configured to perform analysis across APIs to identify relevant characteristic data models, e.g., based on the type of API, etc.

In some embodiments, behavior learning 245 may be configured to perform behavior analysis, e.g., accumulated Big Data analysis based on multiple customers in real time and/or offline, etc. This may include, for example, identifying standard behaviors and protocols, in order to facilitate detection of abnormal behavior which diverts from the standard specification and/or unreasonable/malicious usage of standard specification, such as, e.g., header modification (illegal values, constants, optional/unused, length, checksum, order, etc.), illegal length range violation, timing violation, version violation, keys violation, encryption violation, source violation, handshake violation, session violation, etc.

In some embodiments, relation learning 250 may be configured to provide related analysis of time (time gaps, intervals, schedule, timing, etc.), patterns of traffic, i.e., in bandwidth, volume, size, flow, etc.

Of course, additional and/or other sub-modules may be implemented by learning models engine module 143 to identify additional characteristic data models, depending the specific configuration of the API. For example, in embodiments when SOAP (Simple Object Access protocol) communication is implemented, learning models engine module may analyze and inspect elements (envelope, header, body, fault and related), sender, receiver, message path, initial SOAP sender (aka originator), SOAP intermediary, ultimate SOAP receiver, etc.

In embodiments when XML-RPC communication is implemented, analysis and inspection of array, base64, boolean, date/time, double, integer, string, struct, nil, etc. may be performed. In embodiments when WSDL (Web Services Description Language) in communication is implemented, analysis and inspection of service, port/endpoint, binding, port type/interface, operation, message, types, etc., may be performed.

Furthermore, when any kind of web service in communication is implemented, learning models engine module 143 may be configured to analyze and/or inspect any/all of the following: any structure/template/knowledge of the protocols, such as BEEP (Blocks Extensible Exchange Protocol), E-Business XML (Electronic Business using eXtensible Markup Language), Hessian, JSON-RPC, JSON-WSP, REST (Representational State Transfer), SOAP (outgrowth of XML-RPC, originally an acronym for Simple Object Access Protocol), UDDI (Universal Description, Discovery, and Integration), WPS (Web Processing Service), WSFL (Web Services Flow Language), WSCL (Web Services Conversation Language), XINS (XML Interface for Network Services), XLANG, XML-RPC, SOAP (Simple Object Access Protocol), SOAP-over-UDP, SOAP Message Transmission Optimization Mechanism, WS-Notification, WS-BaseNotification, WS-Topics, WS-BrokeredNotification, WS-Addressing, WS-Transfer, WS-Eventing, WS-Enumeration, WS-MakeConnection, JSON-WSP, WS-Policy, WS-PolicyAssertions, WS-PolicyAttachment, WS-Discovery, WS-Inspection, WS-MetadataExchange, UDDI (Universal Description Discovery and Integration), WSDL 2.0 Core, WSDL 2.0 SOAP Binding, WSDL-S (Web Services Semantics), WSRF (WS-Resource Framework), WS-Security, XML Signature, XML Encryption, XKMS (XML Key Management), WS-SecureConversation, WS-SecurityPolicy, WS-Trust, WS-Federation, WS-Federation Active Requestor Profile, WS-Federation Passive Requestor Profile, Web Services Security Kerberos Binding, Web Single Sign-On Interoperability Profile, Web Single Sign-On Metadata Exchange Protocol, SAML (Security Assertion Markup Language), XACML, P3P, WS-ReliableMessaging, WS-Reliability, WS-RM Policy Assertion, Web Services Resource Framework, WS-Resource, WS-BaseFaults, WS-ServiceGroup, WS-ResourceProperties, WS-ResourceLifetime, WS-Transfer, WS-Fragment, Resource Representation SOAP Header Block, WS-I Basic Profile, WS-I Basic Security Profile, Simple Soap Binding Profile, WS-BPEL, WS- CDL, WSCI (Web Service Choreography Interface), WS-Choreography, XML Process Definition Language, WSCL (Web Services Conversation Language), WS-BusinessActivity, WS-AtomicTransaction, WS-Coordination, WS-CAF, WS-Transaction, WS-Context, WS-CF, WS-TXM, WS-Management, WS-Management Catalog, WS-ResourceTransfer, WSDM, Web Services for Remote Portlets, WS-Provisioning, DPWS (Devices Profile for Web Services), ebXML, etc.

Based on any/all of the various raw learned data which may be provided to the learning models engine module 143, learning models engine module 143 may be configured to determine and/or generate one or more characteristic data models (e.g., identified frameworks, structures, templates, profiles, rules, etc.), which may be used to detect even the slightest deviation from the expected input/output, etc. These characteristic data models may be saved, for example, in a learning models database 255 of database 150.

Figure 3:
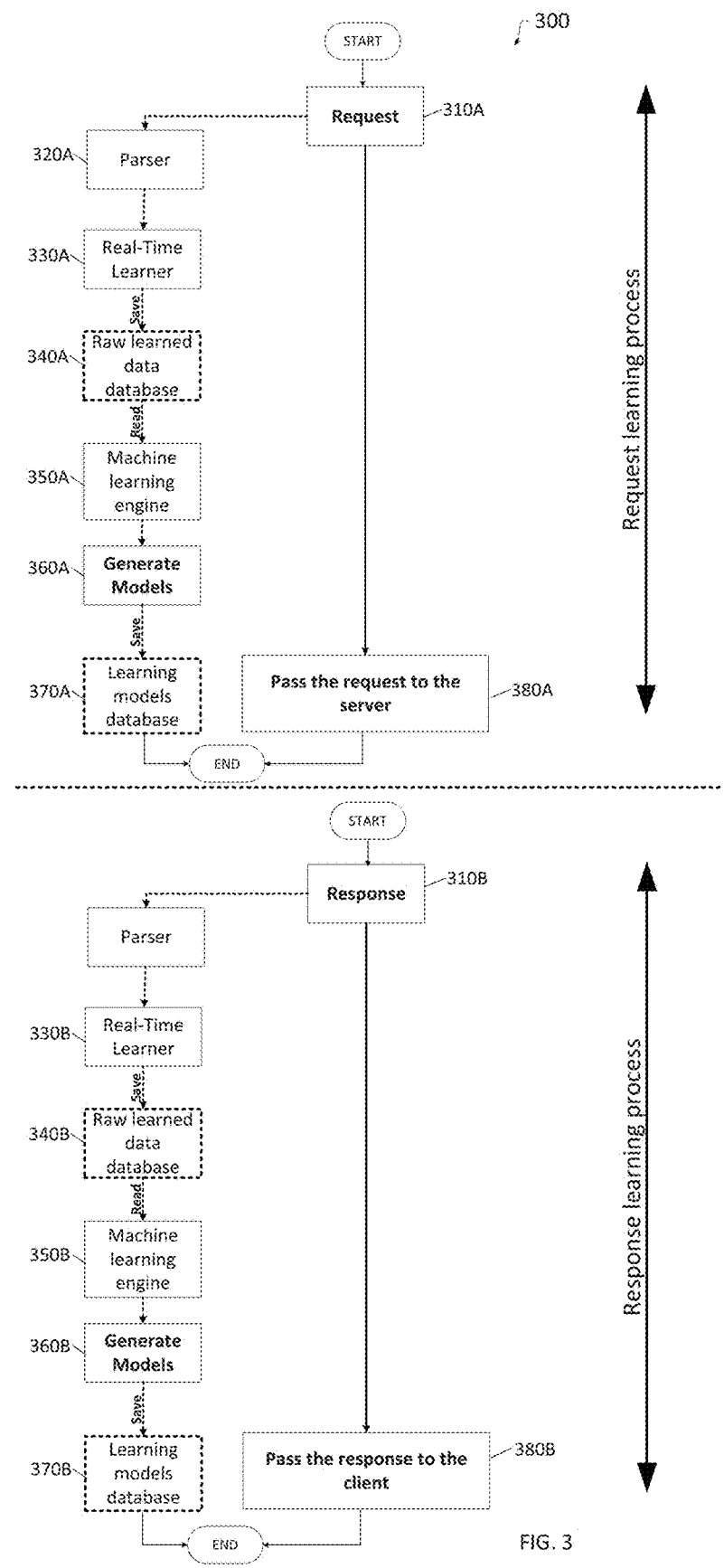
FIG. 3 is a flow diagram of a first part of a method for identifying and preventing malicious API attacks according to at least one embodiment of the invention.

FIG. 3 is a flow diagram of a first part of a method for identifying and preventing malicious API attacks according to at least one embodiment of the invention. In particular, FIG. 3 depicts a flow diagram of a method 300 for identify API attacks during a learning stage or process, according to embodiments of the invention. It should be noted that FIG. 3 shows a learning method or process in which characteristic data models are generate from both requests and responses. In various embodiments, these two learning processes may be implemented simultaneously, consecutively, randomly, periodically, in tandem, separately, etc. Furthermore, in some embodiments, models generated from either/both processes may be stored together, separately, etc., and may inform one another and analysis of the API in general. Of course, in some embodiments, one process/method may be performed to the exclusion of the other, and/or one may be given more or less weight than the other, etc. For the purposes of this document, both processes are described simultaneously. Furthermore, in some embodiments, method 300 may be configured to implement one or more of the elements/features/functions of system 100, e.g., as described in detail in data flow 200 herein.

In some embodiments, method 300 may be performed on a computer having a processor, a memory, and one or more code sets stored in the memory and executed by the processor. In some embodiments, method 300 begins at steps 310A/310B when the processor monitors all requests sent to a server API, and all responses sent from the server API. When a request/response is sent to/from the API, the data is provided to the processor. As described herein, at steps 320A/320B, the processor may parse the data, e.g., by implementing parser module 141. At steps 330A/330B, the processor may identify one or more characteristic data points of each request and response sent, e.g., by implementing Real-time learner module 142. Next, at steps 340A/340B, the processor may save the one or more characteristic data points in a database, such as, for example, raw learned data database 220.

At step 350A/350B, the processor may then expose or provide the one or more characteristic data points to a machine learning engine for analysis such as, for example, learning models engine module 143. At step 360A/360B, the processor may determine/generate/build, based at least in part on the identified one or more characteristic data points, one or more characteristic data models, in which a characteristic data model may represent an expected input to the API and/or an expected output of the API. In doing so, the processor may implement, e.g., learning models engine module 143. Next, at steps 370A/370B, the processor may save the one or more characteristic data models in a database, such as, for example, learning models database 255. Finally, at steps 380A/380B, if the request/response was not already passed to its destination (e.g., depending on whether or not data is held for analysis before being passed to its destination in the particular embodiment), the request/response is passed to its destination at this point (e.g., requests to the server and responses to the client), and the learning method ends.

It should be noted that, in various embodiments, characteristic data models may be generated, determined, built, and/or modified in an automated process as described herein. In other embodiments, the systems/methods described herein may enable a user to manually build structures/templates/profiles/models of common data protocols (JSON, XML, YAML, etc.) over communication protocols (e.g., Ethernet, IP, TCP, UDP, HTTP, HTTPS, HTTP/2, etc.) in a variety of architecture designs (e.g., RESTful, etc.) and different protocols and/or web services such as SOAP, XML-RPC and related for validation, verification, authentication, etc. In some embodiments, manual approval and/or modification of existing structures/templates/profiles may be required. In some embodiments, automatic approval and/or modification of existing structures/templates/profiles may be implemented. Finally, in some embodiments, semi-automatic (and/or partially manual) approval and/or modification of existing structures/templates/profiles may be implemented. Of course, in other embodiments these features may be implemented for validation, verification, authentication, etc., as well.

Further examples of methods which may be implemented in the learning stage include the following:
Learning that certain requests return certain responses.
  For example:
    request A will always return response B
    certain requests will always return a certain response or list of users and not anything else.
Learning of repetitive sequences of requests.
  For example:
    Requests sequence can be "request A followed by request B, followed by request C", such as, Login request→Request for list of products→Requests for specific product.
Learning of relations between field/attribute/property names and values in a request/response.
  For example:
    In request A—Field "entity_type" with the value "company" requires the field "company_name"
    In request B—Field "entity_type" with the value "user" requires the field "first_name"
    Valid requests:
    1. {entity_type: "company", company_name: "Secful"}
    2. {entity_type: "company", company_name: "Pearls"}
    3. {entity_type: "user", first_name: "John"}
    Invalid request:
    1. {entity_type: "company", first_name: "John"}
    2. {entity_type: "user", company_name: "Pearls"}

Figure 4:
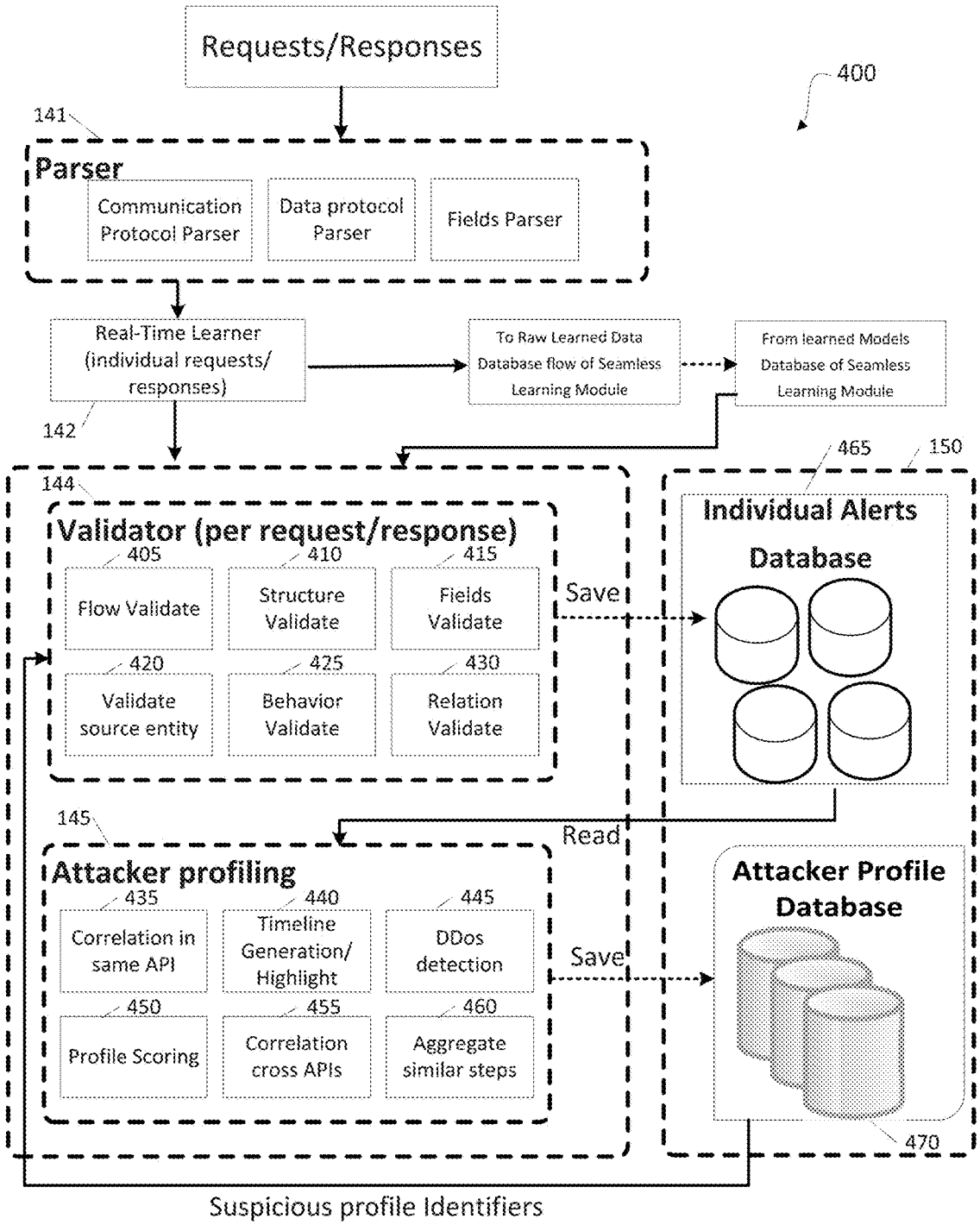
FIG. 4 is a block diagram illustrating a data flow between key components of a second part of the system for identifying and preventing malicious API attacks according to at least one embodiment of the invention.

FIG. 4 is a block diagram illustrating a data flow 400 between key components of a second part of the system for identifying and preventing malicious API attacks according to at least one embodiment of the invention. In particular, FIG. 4 illustrates a data flow between parser module 141, real-time learner 142, validator module 144, attacker profiling module 145, and database 150 of FIG. 1 during a protection stage, according to some embodiments of the invention. As described in detail with reference to FIG. 2, some embodiments of system 100 (FIG. 1) are configured to receive all API calls (requests from clients and responses from the server), e.g., by diverting the calls through the system or otherwise providing a copy of each API call to the system. In some embodiments, during the protection stage all API calls may be routed through the system so as to enable blocking of malicious call if necessary, as described herein.

As described in detail with reference to FIG. 2, in some embodiments, system 100 (of FIG. 1) may include parser module 141, which is configured to parse the data strings representing the requests/responses into consumable segments of information. System 100 may further include real-time learner module 142, which in some embodiments may be configured to receive data that has been parsed by parser module 141. Information can be passed from parser module 141 to real-time learner module 142, which is configured to analyze each individual request/response and learn or otherwise identify the composition of that request/response.

It should be noted that, in various embodiments, real-time learner module 142 may be configured to be executed both in the learning stage and in the protection stage, during specific intervals, etc. As such, characteristic data points identified by the real-time learner module 142 while evaluating individual requests/response during the protection stage (as with the learning stage) may be provided to the raw learned data database 220, and included in any/all analyses performed by learning models engine module 143 in the course of generating, determining, building, and/or updating characteristic data models, as described herein. In turn, new and/or updated characteristic data models can be constantly and/or periodically fed back into the system, as described herein, to be used during validation of API requests/responses.

In some embodiments, system 100 may further include validator module 144, which in some embodiments may be configured to receive raw learned data from sent requests/responses (e.g., parsed data from each request and/or response) and either validate or invalidate the sent requests/responses by comparing the characteristic data points to previously determined/generated characteristic data models. In some embodiments, validator module 144 may be configured to perform validation and/or protection, by employing characteristic data models, protocols, specifications, and/or standards, to detect abnormal behavior which diverts from the standard, model, etc., and/or unreasonable/malicious usage of standard specifications.

In some embodiments, the validator module 144 may be further configured to score the severity of the invalidity/abnormality of each request/response according to the learning models of the API. For example, in some embodiments, the validator module 144 may provide a first score on a "per field" level, a second score on a "per header" level, and/or an overall call score which may combine all scores in the same request, and output the scores to the validator module 144. The validator module 144 may then use the scores in determining how to treat an invalid API call. For example, if a characteristic data model indicates that an input for a given field, e.g., a "first name" field, should start with an uppercase letter, e.g., "N", detection of even a lowercase "n" would invalidate the API call. Of course, in some embodiments, the system may be configured to view this as a minor infraction and allow the API call to pass (while logging the discrepancy nonetheless). Conversely, detection of a "/" where an uppercase letter is expected based on the characteristic data model might, in this example, cause the system to block the API call entirely, and/or send out an alert to a server manager, as this is often a character used when attempting to insert malicious code, etc.

In some embodiments, the validator module 144 may include one or more sub-modules for implementing various types of validating functions and analyses, in order to determine the validity or invalidity of an API call (request and/or response). For example, validator module 144 may contain flow validate 405, structure validate 410, fields validate 415, validate source entity/wisdom of crowds 420, behavior validate 425, and/or relation validate 430. In some embodiments, these (and/or other) sub-modules may be implemented in order to validate received characteristic data points against results of various corresponding analyses performed by learning models engine module 143 (FIG. 2) during the learning stage and manifested as characteristic data models.

In some embodiments, results of these validations/invalidations may be stored and/or used for additional analysis and protection measures. For example, validator module 144 may be configured to store all in individual alerts generated from invalid API calls, e.g., in an individual alerts database 465 of database 150. Furthermore, an attacker profiling module 145 may be configured to analyze accumulated data from the individual alerts database 465, and identify suspicious (and/or verified) attacker profiles. In some embodiments, attacker profiling module 145 may be configured to determine and/or generate a suspicion score (or profile score) by accumulating and/or scoring all the steps (e.g., invalid/abnormal/suspicious requests over time) together to prioritize the worst profiles.

In some embodiments, the attacker profiling module 145 may include one or more sub-modules for implementing various types of profiling functions and analyses, in order to determine the relative trustworthiness or untrustworthiness of the user associated with a particular profile, and of the profile itself. For example, attacker profiling module 145 may include a correlation in same API module 435, to enable correlating numerous alerts within the same API; timeline generation/highlight module 440 for generating e.g., a visual timeline; DDos detection module 445 for detecting DDos based on the learned API; profile scoring module 450; correlation across (multiple) APIs 455; and aggregating similar steps module 460. Attacker profiling module 145 may use any/all of these (and/or other) modules to generate an attacker profile (and associated suspicion/profile score) for each client identifier associated with an invalid request/response, and/or may correlate between invalid attempts to find attackers by IP address, user ID, token etc. Furthermore, in some embodiments, attacker profiling module 145 may be configured to identify same attackers across APIs—same DNS and not same DNS; same identifier, e.g., IP address, personal e-mail address, phone number, fake SSN, etc.; same IOC (Indicators Of Compromise) and/or behavior; and/or same pattern of attack.

Figure 8:
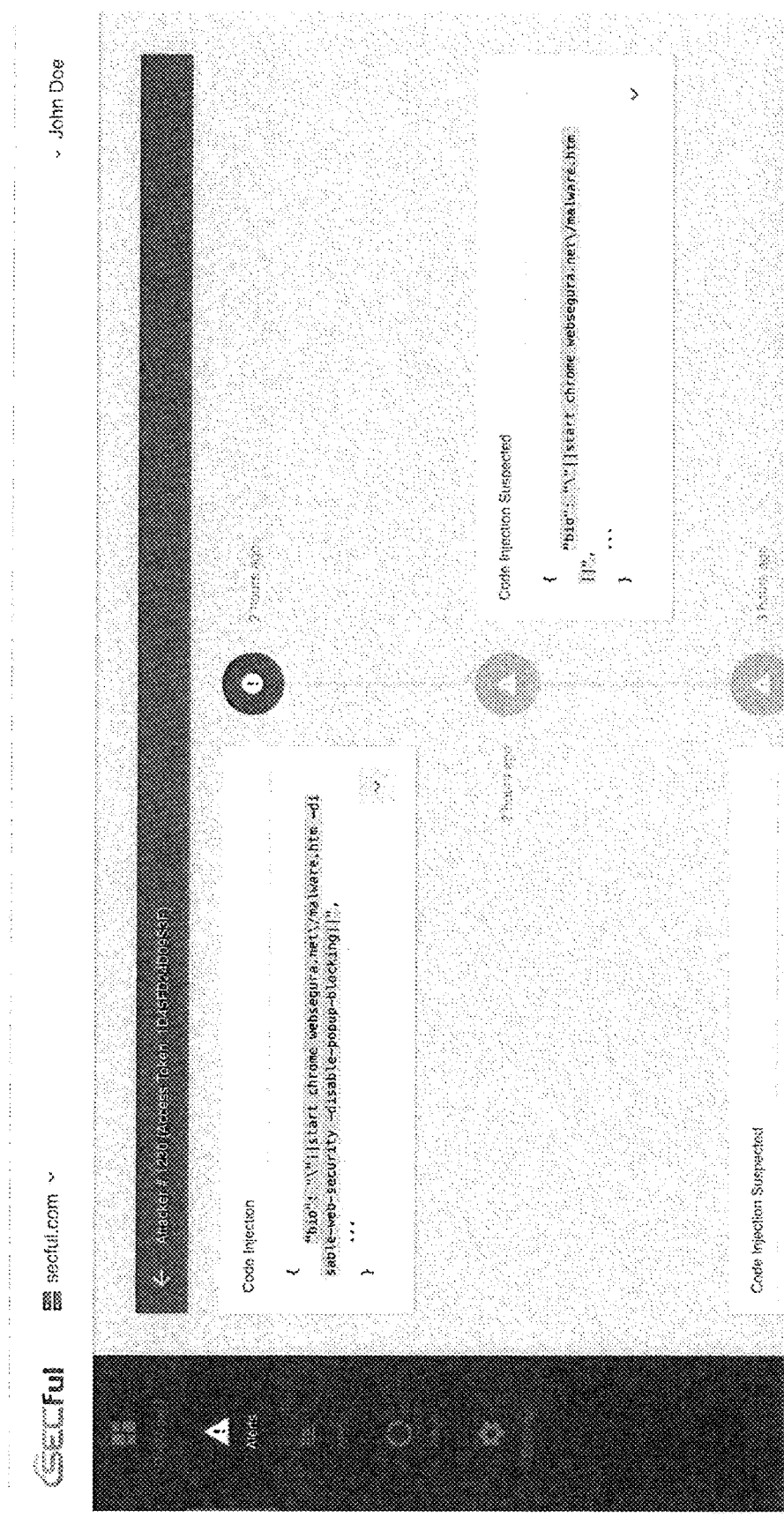
FIG. 8 is an example attacker/alert timeline generated according to at least one embodiment of the invention.

Turning briefly to FIG. 8, in some embodiments, timeline generation/highlight module 440 may be configured to generate a visual timeline. Representation of invalid alerts/attacks in a timeline can be an important tool in being able to respond to threats and take corrective measures. As such, the timeline generation/highlight module 440 may also be configured to highlight important sections in the timeline, aggregate similar steps (invalid/abnormal/suspicious requests over time) to one in timeline, etc.

In some embodiments, the attacker profiling module 145 may be configured to store these profiles and/or associated profile scores in an attacker profile database 470 of database 150. Such profiles and their associated scores may be used in future validation processes. For example, in some embodiments, all profiles may be fed back to the validator module 144 regardless of the relative weight of the associated score, enabling tracking of each step associated with a profile after the finding first suspicious activity of a sender. In other embodiments, only profiles having a predefined threshold score may be monitored for.

Figure 5:
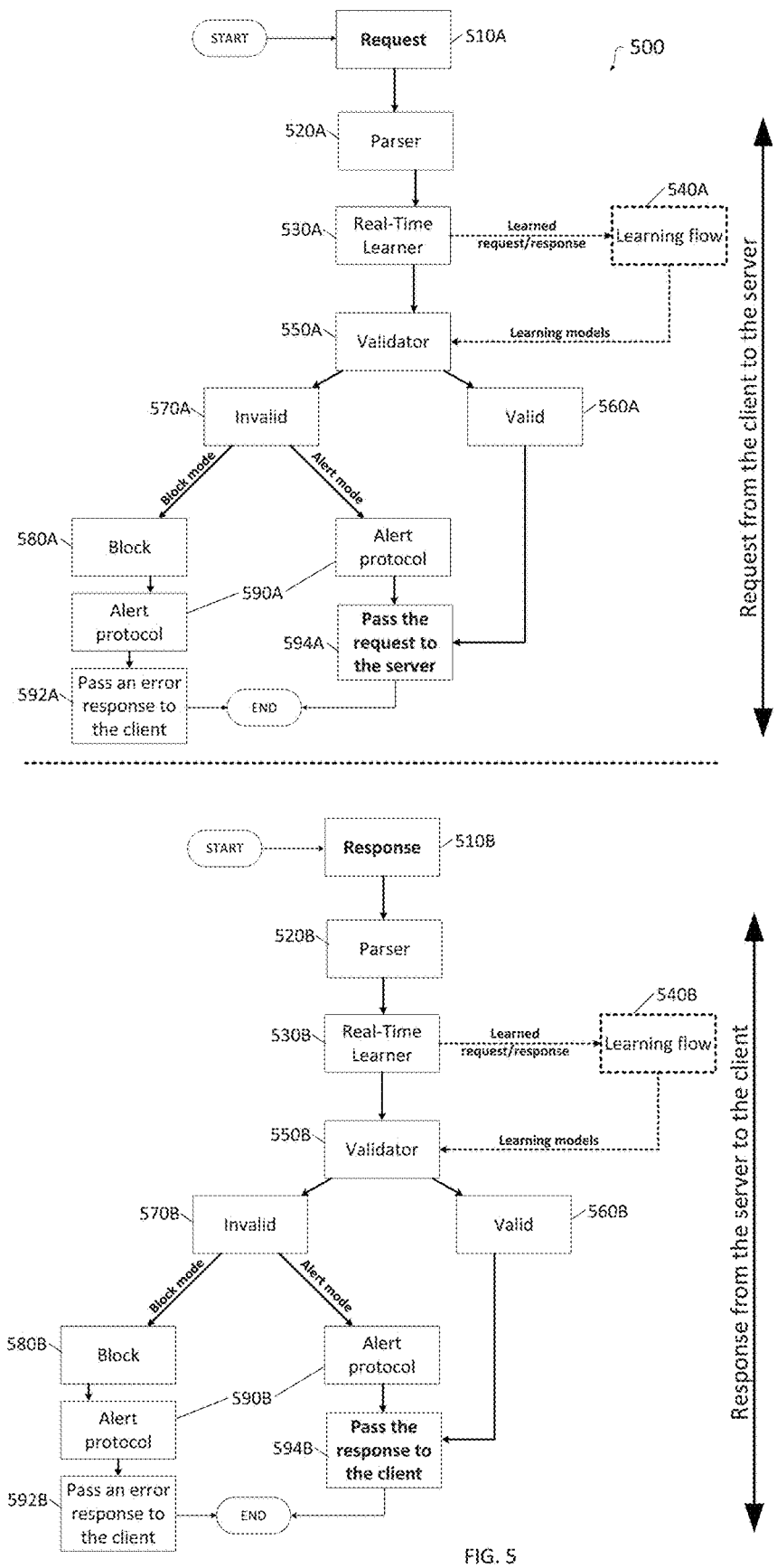
FIG. 5 is a flow diagram of a second part of a method for identifying and preventing malicious API attacks according to at least one embodiment of the invention.

FIG. 5 is a flow diagram of a second part of a method for identifying and preventing malicious API attacks according to at least one embodiment of the invention. In particular, FIG. 5 depicts a flow diagram of a method 500 for preventing API attacks during a protection stage or process, according to embodiments of the invention. It should be noted that FIG. 5 (like FIG. 3) shows a protection method or process in which characteristic data points of both requests and responses are validated against previously defined characteristic data models, while also continuing to learn from newly arriving data. In various embodiments, these two protection processes may be implemented simultaneously, consecutively, randomly, periodically, in tandem, separately, etc. Furthermore, in some embodiments, models may be updated based on data from either/both processes, resulting alerts from invalid requests/responses may be stored together, separately, etc., and/or may inform one another, and analysis of the API in general. Of course, in some embodiments, one process/method may be performed to the exclusion of the other, and/or one may be given more or less weight than the other, etc. For the purposes of this document, both processes are described simultaneously. Furthermore, in some embodiments, method 500 may be configured to implement one or more of the elements/features/functions of system 100, e.g., as described in detail in data flow 400 herein.

In some embodiments, method 500 may be performed on a computer having a processor, a memory, and one or more code sets stored in the memory and executed by the processor. In some embodiments, method 500 begins at steps 510A/510B when the processor monitors all requests sent to a server API, and all responses sent from the server API. When a request/response is sent to/from the API, the data is provided to the processor. As described herein, at steps 520A/520B, the processor may parse the data, e.g., by implementing parser module 141. At steps 530A/530B, the processor may identify one or more characteristic data points of each request and response sent, e.g., by implementing Real-time learner module 142. Next, at steps 540A/540B, the processor may save the one or more characteristic data points in a database, such as, for example, raw learned data database 220, and the processor may then expose or provide the one or more characteristic data points to a machine learning engine for analysis such as, for example, learning models engine module 143, in order to continually learn from the incoming data (e.g., adding new characteristic data models and/or updating existing ones).

At step 550A/550B, the processor may either validate or invalidate the sent request/response by comparing associated characteristic data points of the request/response to previously determined/generated characteristic data models. In doing so, the processor may implement, e.g., validator module 144.

At step 560A/560B, the processor may validate the request/response, in which case it may be passed on to its intended destination (e.g., the server or the client device) at steps 594A/594B. However, if at steps 570A/570B the API call is invalidated (when compared, matched, or otherwise validated against the relevant characteristic data models), depending on, e.g., the severity of the invalidity, the processor may either block the API call (steps 580A/580B) and activate an alert protocol (steps 590A/590B) (e.g., recording an alert and/or generating an alert on a visual alert timeline), or simply activate an alert protocol without blocking the API call (e.g., if the invalidity is not considered severe or threatening. If the API call is blocked and an alert protocol is activated, then at steps 592A/592B, in some embodiments an error may be sent to the client device, e.g., notifying about the blocked request/response, and/or providing a warning regarding such actions. Finally, if the API call is not blocked but an alert protocol is activated, then at steps 594A/594B the API call may be passed on to its intended destination (e.g., the server or the client device), and the protection method ends.

Other features of the systems and methods described herein may include automated analytics of APIs based on the specialized learning. The analytics may include. For example: 1. statistics of API calls per URL, per URL+method, per field inside every API call. 1. Automated documentation generation of APIs based on the specialized learning: the documentation may include the entire structure of the API—URLs, methods per URL, all the fields of every resource (URL) per method, etc. 3. Automated performance and monitoring based on the specialized learning: Monitoring including API endpoints (URL) availability, response time, latency, API calls rate; and 4. Rate limiting of API calls based on the specialized learning.

Figure 9:
FIG. 9 is an example visual attacker list generated according to at least one embodiment of the invention.

Turning briefly to FIG. 9, in some embodiments a visual attacker list may be generated, e.g., using gathered data analytics, and/or displayed, which may further aid a server manager, etc., in addressing the various security issues identified in the various alerts.

Figure 10:
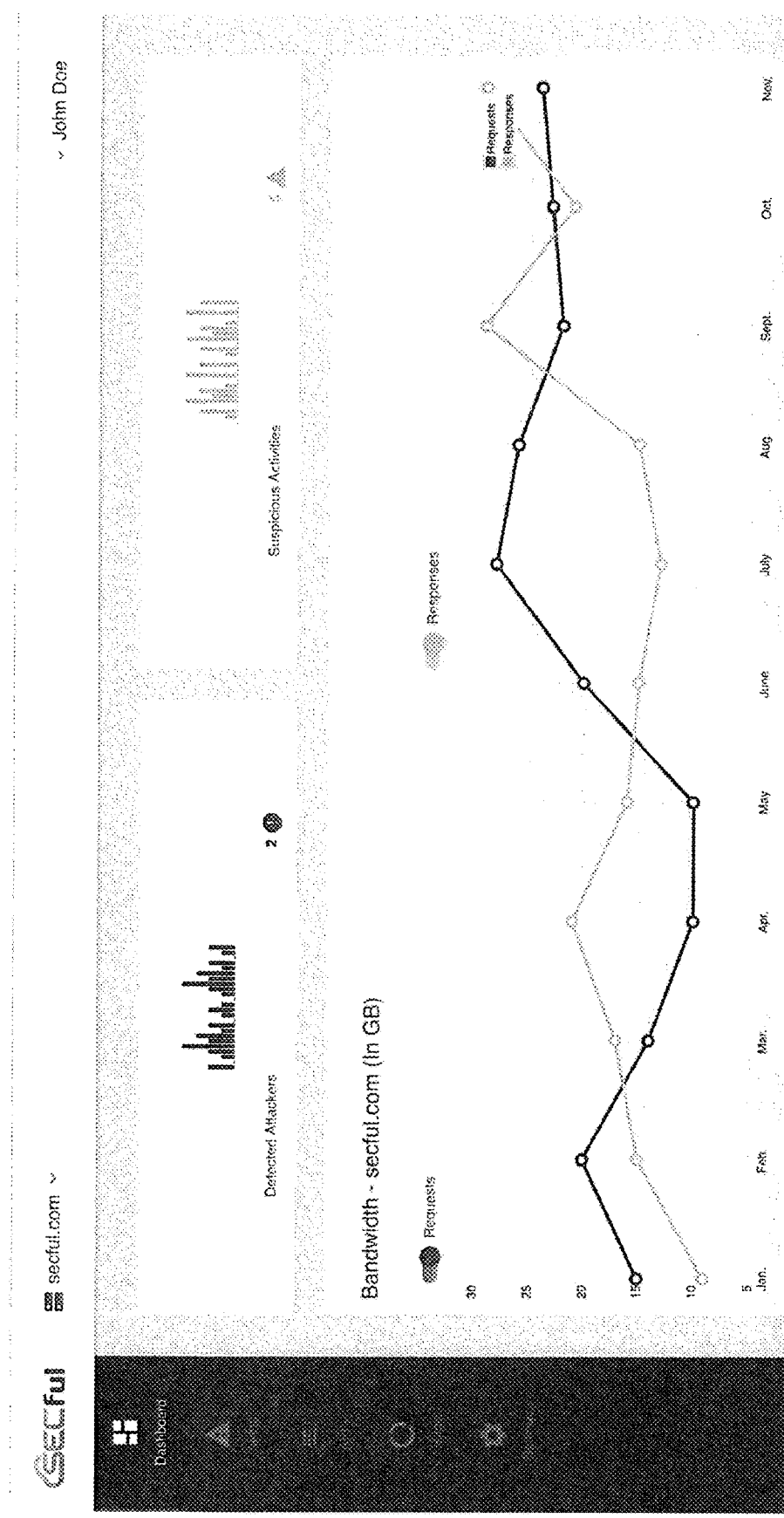
FIG. 10 is an example visual API call tracker generated according to at least one embodiment of the invention.

Turning briefly to FIG. 10, in some embodiments a visual API call tracker, generated, e.g., using gathered data analytics, which may provide additional visual information to assist the manager or owner of the server/API in managing the health and security of its server/API.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for identifying and preventing malicious server-side application programming interface (API) attacks over a network in a client-server architecture, performed on a computer having a processor, a memory, and one or more code sets stored in the memory and executed by the processor, the method comprising:

during a learning stage:
monitoring, by the processor, all requests sent to a server-side API over the network and all responses sent from the server-side API over the network;

identifying, by the processor, one or more first characteristic data points of each request and response sent during the learning stage; and determining, by the processor, based at least in part on the identified one or more first characteristic data points, one or more characteristic data models, wherein a characteristic data model represents at least one of an expected input to the API and an expected output of the API; and during a protection stage:

monitoring, by the processor, all requests sent to the server-side API and all responses sent from the server-side API;

identifying, by the processor, one or more second characteristic data points of each request and response sent during the protection stage;

one of validating and invalidating, by the processor, the identified one or more second characteristic data points against the one or more characteristic data models;

generating, by the processor, one or more attacker profiles based at least in part on the validating step;

determining, by the processor, one or more suspicion scores for each attacker profile; and identifying, by the processor, one or more suspicious profiles based at least in part on respective suspicion scores, wherein all future requests and responses related to an identified suspicious profile are flagged with an alert irrespective of validity.

2. The method as in claim 1, further comprising:
passing to the server, by the processor, requests having no invalidated one or more second characteristic data points; and
passing from the server, by the processor, responses having no invalidated one or more second characteristic data points.

3. The method as in claim 1, further comprising:
blocking to the server, by the processor, requests having invalidated one or more second characteristic data points; and
blocking from the server, by the processor, responses having invalidated one or more second characteristic data points.

4. The method as in claim 1, further comprising:
generating, by the processor, an alert for each request having invalidated one or more second characteristic data points; and
generating, by the processor, an alert for each response having invalidated one or more second characteristic data points.

5. The method as in claim 4, further comprising:
generating, by the processor, an alert timeline, wherein the alert timeline represents a selection of one or more aggregations of alerts, the alerts in each of the one or more aggregations having a predefined similarity, the one or more aggregations being organized in a predefined order; and
displaying, by the processor, the alert timeline on a visual display.

6. The method of claim 1, further comprising: updating, by the processor, the one or more characteristic data models based at least in part on the identified one or more second characteristic data points of each request and response sent during the protection stage.

7. The method as in claim 1, wherein the server-side API is one of a RESTful API, a SOAP API, an XML-RPC API, and a WSDL API.

8. The method as in claim 1, further comprising generating, by the processor, documentation comprising information reflecting a complete structure of the server-side API.

9. A system for identifying and preventing malicious server-side application programming interface (API) attacks over a network in a client-server architecture, comprising:
a computer having a processor and a memory; and
one or more code sets stored in the memory and executed by the processor, which configure the processor to:

during a learning stage:

monitor all requests sent to a server-side API over the network and all responses sent from the server-side API over the network;

identify one or more first characteristic data points of each request and response sent during the learning stage; and determine based at least in part on the identified one or more first characteristic data points, one or more characteristic data models, wherein a characteristic data model represents at least one of an expected input to the API and an expected output of the API; and during a protection stage:

monitor all requests sent to the server-side API and all responses sent from the server-side API;

identify one or more second characteristic data points of each request and response sent during the protection stage;

one of validate and invalidate the identified one or more second characteristic data points against the one or more characteristic data models;

generate one or more attacker profiles based at least in part on the validating step;

determine one or more suspicion scores for each attacker profile; and identify one or more suspicious profiles based at least in part on respective suspicion scores, wherein all future requests and responses related to an identified suspicious profile are flagged with an alert irrespective of validity.

10. The system as in claim 9, the processor further configured to:
pass to the server requests having no invalidated one or more second characteristic data points; and
pass from the server responses having no invalidated one or more second characteristic data points.

11. The system as in claim 9, the processor further configured to:
block to the server requests having invalidated one or more second characteristic data points; and
block from the server responses having invalidated one or more second characteristic data points.

12. The system as in claim 9, the processor further configured to:
generate an alert for each request having invalidated one or more second characteristic data points; and
generate an alert for each response having invalidated one or more second characteristic data points.

13. The system as in claim 12, the processor further configured to:
generate an alert timeline, wherein the alert timeline represents a selection of one or more aggregations of alerts, the alerts in each of the one or more aggregations having a predefined similarity, the one or more aggregations being organized in a predefined order; and
display the alert timeline on a visual display.

14. The system as in claim 9, the processor further configured to: update the one or more characteristic data models based at least in part on the identified one or more second characteristic data points of each request and response sent during the protection stage.

15. The system as in claim 9, wherein the server-side API is one of a RESTful API, a SOAP API, an XML-RPC API, and a WSDL API.

16. The system as in claim 9, the processor further configured to generate documentation comprising information reflecting a complete structure of the server-side API.

17. A method for identifying and preventing malicious server-side application programming interface (API) attacks over a network in a client-server architecture, performed on a computer having a processor, a memory, and one or more code sets stored in the memory and executed by the processor, the method comprising:
during a learning stage:
monitoring, by the processor, all requests sent to a server-side API over the network from a plurality of client devices and all responses sent from the server-side API over the network to each of the plurality of client devices;
identifying, by the processor, one or more first characteristic data points of each request sent by a given client device and each response sent to the given client device during the learning stage; and
determining, by the processor, based at least in part on the identified one or more first characteristic data points, one or more characteristic data models represents at least one of an expected input to the server-side API and an expected output of the server-side API; and
during a protection stage:
monitoring, by the processor, all requests sent to the server-side API and all responses sent from the server-side API;
identifying, by the processor, one or more second characteristic data points of each request and response sent during the protection stage;
one of validating and invalidating, by the processor, the identified one or more second characteristic data points against the one or more characteristic data models;
passing to and from the server, by the processor, requests having no invalidated one or more second characteristic data points;
blocking to and from the server, by the processor, requests having invalidated one or more second characteristic data points;
generating, by the processor, one or more attacker profiles based at least in part on the validating step;
determining, by the processor, one or more suspicion scores for each attacker profile; and
identifying, by the processor, one or more suspicious profiles based at least in part on respective suspicion scores, wherein all future requests and responses related to an identified suspicious profile are flagged with an alert irrespective of validity.

18. The method as in claim 17, further comprising:
generating, by the processor, an alert for each request having invalidated one or more second characteristic data points; and
generating, by the processor, and alert for each response having invalidated one or more second characteristic data points.

19. A method for identifying and preventing malicious server-side application programming interface (API) attacks over a network in a client-server architecture, performed on a computer having a processor, a memory, and one or more code sets stored in the memory and executed by the processor, the method comprising:
during a learning stage:
monitoring, by the processor, all requests sent to a server-side API over the network and all responses sent from the server-side API over the network;
identifying, by the processor, one or more first characteristic data points of each request and response sent during the learning stage; and
determining, by the processor, based at least in part on the identified one or more first characteristic data points, one or more characteristic data models, wherein a characteristic data model represents at least one of an expected input to the API and an expected output of the API; and
during a protection stage:
monitoring, by the processor, all requests sent to the server-side API and all responses sent from the server-side API;
identifying, by the processor, one or more second characteristic data points of each request and response sent during the protection stage;
one of validating and invalidating, by the processor, the identified one or more second characteristic data points against the one or more characteristic data models;
generating, by the processor, an alert for each request having invalidated one or more second characteristic data points;
generating, by the processor, and alert for each response having invalidated one or more second characteristic data points;
generating, by the processor, an alert timeline, wherein the alert timeline represents a selection of one or more aggregations of alerts, the alerts in each of the one or more aggregations having a predefined similarity, the one or more aggregations being organized in a predefined order; and
displaying, by the processor, the alert timeline on a visual display.

20. A system for identifying and preventing malicious server-side application programming interface (API) attacks over a network in a client-server architecture, comprising:
a computer having a processor and a memory; and
one or more code sets stored in the memory and executed by the processor, which configure the processor to:
during a learning stage:
monitor all requests sent to a server-side API over the network and all responses sent from the server-side API over the network;
identify one or more first characteristic data points of each request and response sent during the learning stage; and
determine, based at least in part on the identified one or more first characteristic data points, one or more characteristic data models, wherein a characteristic data model represents at least one of an expected input to the API and an expected output of the API; and
during a protection stage:
monitor all requests sent to the server-side API and all responses sent from the server-side API;

identify one or more second characteristic data points of each request and response sent during the protection stage;
one of validate and invalidate the identified one or more second characteristic data points against the one or more characteristic data models;
generate an alert for each request having invalidated one or more second characteristic data points;
generate an alert for each response having invalidated one or more second characteristic data points;
generate an alert timeline, wherein the alert timeline represents a selection of one or more aggregations of alerts, the alerts in each of the one or more aggregations having a predefined similarity, the one or more aggregations being organized in a predefined order; and
display the alert timeline on a visual display.

* * * * *